United States Patent
Cardoen et al.

(10) Patent No.: US 9,969,817 B2
(45) Date of Patent: May 15, 2018

(54) PHENYL GLYCIDYL ETHER ADDUCT OF MALTODEXTRIN

(71) Applicant: Rohm and Haas Company, Philadelphia, PA (US)

(72) Inventors: Gregoire Cardoen, Blue Bell, PA (US); Jonathan DeRocher, Coopersburg, PA (US); Antony K. Van Dyk, Blue Bell, PA (US); Tianlan Zhang, Garnet Valley, PA (US)

(73) Assignee: Rohm and Haas Company, Collegeville, PA (US)

( * ) Notice: Subject to any disclaimer, the term of this patent is extended or adjusted under 35 U.S.C. 154(b) by 0 days. days.

(21) Appl. No.: 15/375,535

(22) Filed: Dec. 12, 2016

(65) Prior Publication Data

US 2017/0166663 A1    Jun. 15, 2017

Related U.S. Application Data

(60) Provisional application No. 62/267,363, filed on Dec. 15, 2015.

(51) Int. Cl.
| | |
|---|---|
| C08B 31/14 | (2006.01) |
| C09D 7/12 | (2006.01) |
| C08B 30/18 | (2006.01) |
| C09D 103/06 | (2006.01) |

(52) U.S. Cl.
CPC .............. *C08B 31/14* (2013.01); *C08B 30/18* (2013.01); *C09D 7/65* (2018.01); *C09D 103/06* (2013.01)

(58) Field of Classification Search
None
See application file for complete search history.

(56) References Cited

U.S. PATENT DOCUMENTS

| | | |
|---|---|---|
| 4,762,857 A | 8/1988 | Bonin, Jr. et al. |
| 4,831,128 A | 5/1989 | Tsai et al. |
| 4,839,164 A | 6/1989 | Smith |
| 5,026,566 A | 6/1991 | Roser |
| 5,340,394 A | 8/1994 | Elsamanoudi |
| 5,463,101 A | 10/1995 | Reierson |
| 5,543,513 A | 8/1996 | Mandai et al. |
| 6,762,230 B2 | 7/2004 | Brandenburger et al. |
| 7,238,645 B1 | 7/2007 | Chow et al. |
| 7,381,796 B2 | 6/2008 | Roser |
| 7,705,082 B2 | 4/2010 | Porzio et al. |
| 8,231,925 B2 | 7/2012 | Ganesan et al. |
| 8,444,758 B2 | 5/2013 | Stockl et al. |
| 8,822,580 B2 | 9/2014 | Korenkiewicz et al. |
| 2007/0155880 A1 | 7/2007 | Bobsein et al. |
| 2008/0103237 A1 | 5/2008 | Strepka et al. |
| 2009/0076202 A1 | 3/2009 | Seibold et al. |
| 2009/0186972 A1 | 7/2009 | Zong et al. |
| 2010/0280162 A1 | 11/2010 | Stesikova et al. |
| 2014/0205530 A1 | 7/2014 | Guillot et al. |
| 2014/0256852 A1 | 9/2014 | Vandezande et al. |
| 2015/0073080 A1 | 3/2015 | Wu et al. |
| 2015/0133604 A1 | 5/2015 | Zong et al. |

FOREIGN PATENT DOCUMENTS

| | | |
|---|---|---|
| DE | 4417947 A1 | 11/1995 |
| EP | 0282623 A1 | 9/1988 |
| EP | 0384167 A1 | 8/1990 |
| JP | 1056602 A | 3/1989 |
| WO | 1999010413 A2 | 3/1999 |
| WO | 2001070024 A2 | 9/2001 |
| WO | 2007128388 A2 | 11/2007 |
| WO | 2014044616 A1 | 3/2014 |
| WO | 2014146958 A1 | 9/2014 |

OTHER PUBLICATIONS

Burmeister, DE 2806450, Aug. 16, 1979, machine translation.*

* cited by examiner

*Primary Examiner* — Layla D Berry

(74) *Attorney, Agent, or Firm* — Reid Willis

(57) ABSTRACT

The present invention relates to a compound which is a phenyl glycidyl ether adduct of maltodextrin and its method of preparation. The compound of the present invention is useful as an open time additive in paint formulations.

10 Claims, No Drawings

PHENYL GLYCIDYL ETHER ADDUCT OF MALTODEXTRIN

BACKGROUND OF THE INVENTION

The present invention relates to a compound which is a phenyl glycidyl ether adduct of maltodextrin. This compound is useful as an open time additive in a coatings formulation.

Government regulations and market movement continually drive toward zero volatile organic compounds (VOC) for coating formulations. Consequently, waterborne formulations that are free of volatile solvents and coalescents have become increasingly popular in the industry. Nevertheless, paint properties have been compromised due to this sea change; among them is open time, which is the period of time during which a freshly applied paint film can be reworked without leaving brush marks. In a solvent-borne system, open time is about 30 to 45 min; in a typical waterborne formulation, open time is on the order of 3 to 5 min. Accordingly, there is a need in the art to find an additive for waterborne formulations that increases open time over currently available additives without degrading other properties of the final coating, such as film adhesive and cohesive strength, hardness, block resistance, early blister resistance, scrub and wash resistance, stain resistance, and mar resistance.

SUMMARY OF THE INVENTION

The present invention addresses a need in the art by providing a compound which is a phenyl glycidyl ether adduct of the compound of Formula I:

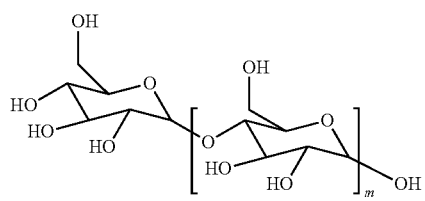

I where m is from 1 to 60.

In a second aspect, the present invention is a method comprising the step of contacting maltodextrin with phenyl glycidyl ether under such conditions to form the phenyl glycidyl ether adduct of maltodextrin, where maltodextrin is represented by the following Formula I:

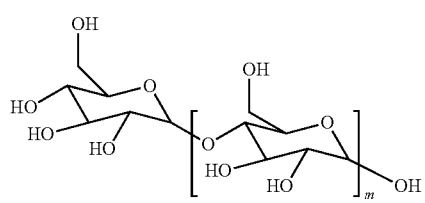

I where m is from 1 to 60.

The compound of the present invention is useful as a surfactant that can be used as an open time additive in paint formulations.

DETAILED DESCRIPTION OF THE INVENTION

The present invention is a compound which is a phenyl glycidyl ether adduct of the compound of Formula I:

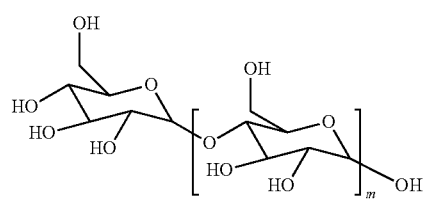

I where m is from 1 to 60.

Preferably, m is from 5, more preferably from 11, and most preferably from 15, to preferably 48, more preferably to 36, and most preferably to 24.

As used herein, the term "phenyl glycidyl ether adduct of the compound of Formula I" refers to a compound or a mixture of compounds that are formed from the reaction of phenyl glycidyl ether and maltodextrin (the compound of Formula I). For example, a compound formed from the reaction of 2 moles of phenyl glycidyl ether and 1 mole of maltodextrin can be represented by the following Formula II:

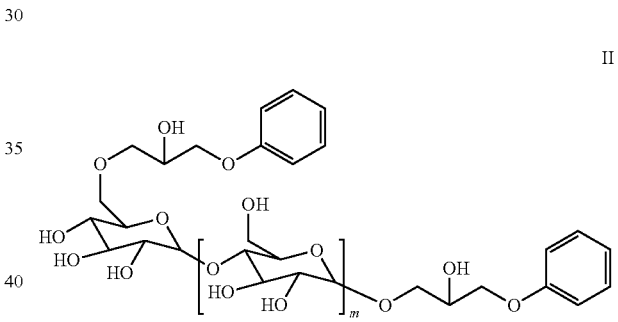

II

The actual point of attachment of the ring-opened glycidyl ether groups may be at any of the available OH sites of the maltodextrin. Furthermore, the ring-opened phenyl glycidyl ether groups are phenoxypropanol groups represented by either or both of the following isomers:

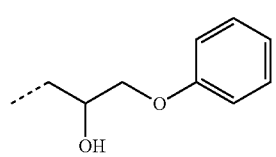

Isomer 1

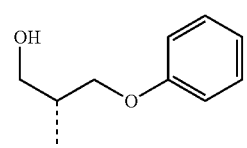

Isomer 2 where the dotted lines represent the point of attachment of the phenoxypropanol group to an available oxygen atom of the maltodextrin molecule. The adduct can be characterized by number average molecule molecular weight ($M_n$) as measured by Matrix Assisted Laser Desorption Ionization Mass Spectrometry (MALDI-MS). By definition, it is assumed that the response factors for all the intensities observed in the mass spectrum are the same. The $M_n$ of the adduct is in the range of 500, more preferably from 1000, and from preferably from 1500 Daltons, to 10,000, preferably to 8000, more preferably to 5000, and most preferably to 3500 Daltons.

Preferably, the adduct is a multifunctional phenyl glycidyl ether adduct; that is to say, the maltodextrin is substituted with at least two phenoxypropanol groups, more preferably from two to four phenoxypropanol groups, more preferably two or three phenoxypropanol groups, and most preferably two phenoxypropanol groups. The degree of substitution was determined by MALDI-MS.

In a second aspect, the present invention is a method comprising the step of contacting maltodextrin with phenyl glycidyl ether under such conditions to form the phenyl glycidyl ether adduct of maltodextrin. The phenyl glycidyl ether adduct of maltodextrin can be prepared, for example, by contacting phenyl glycidyl ether with maltodextrin in the presence of a catalyst. Base catalysts such as NaOH, KOH, $Na_2CO_3$, or $K_2CO_3$ are preferred but acid catalysts such as sulfuric acid, hydrochloride acid, p-toluene sulfonic acid, boron trifluoride, or iron chloride are also suitable. The reaction is advantageously carried out at a temperature in the range of from 25° C., preferably from 25° C., more preferably from 60° C., to 100° C., more preferably to 90° C.

The reaction is conveniently carried out in the presence of a polar solvent, preferably a mixture of solvents that includes water and one or more polar organic solvents such as ethanol, isopropanol, tetrahydrofuran, acetone, or methyl ethyl ketone. The volume/volume ratio of water to the organic solvent is typically in the range of from 20:80 to 80:20. High boiling polar organic solvents such as dimethylacetamide, dimethylformamide, and N-methyl-2-pyrrolidone are also suitable solvents, alone or in combination with water and/or another solvent.

In a preferred method for preparing the compound of Formula II, the compound of Formula I is contacted with phenyl glycidyl ether in the presence of NaOH, with water and isopropanol as a solvent, at a temperature in the range of from 60 to 85° C. The degree of substitution can be controlled by adjusting the mole-to-mole ratio of the maltodextrin and the phenyl glycidyl ether; typically, however, the final product is a mixture of mono- and polysubstituted adducts, and may contain unreacted maltodextrin. The preferred mole:mole ratio of phenyl glycidyl ether to maltodextrin is from 1.2:1, more preferably from 1.5:1, more preferably from 1.8:1, and most preferably from 2.0:1, to preferably 4:1, more preferably to 3.5:1, more preferably to 3.2:1, and most preferably to 3.0:1.

The compound of the present invention has been found to effective as an open time additive, particularly in waterborne formulations.

Example 1—Preparation of Phenyl Glycidyl Ether Adduct of Maltodextrin

A commercially available maltodextrin (obtained from Sigma-Aldrich SKU419672) having a Dextrose Equivalent of from 4.0 to 7.0 (15 g, ~3500 g/mol, m~22, 4.3 mmol) was added to a 3-neck 500-mL round bottom flask equipped with a condenser, an overhead stirrer and a nitrogen purge. Deionized water (81.25 g) was added to the flask and the maltodextrin was allowed to dissolve for 15 min at 190 rpm. Isopropanol (20.31 g) was then added and the mixture was purged with nitrogen for 1 h. Next, sodium hydroxide (50% solution, 2.67 g. 33 mmol) was added dropwise to the reactor over 2 min and purging with nitrogen was continued for another 30 min. Phenyl glycidyl ether (1.26 g, 8.4 mmol) was then added and the mixture was purged for an additional 10 min before heating the reaction mixture to 78° C. The reaction temperature was reached after 10 min, at which time the mixture had dissolved fully and turned light brown. After 1 h at 78° C., the reaction mixture was cooled to room temperature whereupon acetic acid (2 g, 33 mmol) was added. The reaction products were isolated by removing solvent in vacuo, then redissolving the resultant solid in water (150 mL), then freeze drying. A brown solid (15.1 g) was obtained. Structure was confirmed by $^1$H NMR ($\delta$ 7.41-6.78, 10 H, $\delta$ 6.36-3.37, 229 H) and MALDI-TOF mass spectrometry (each set of peaks separated by 162 Da, and as an example for one set of peaks: m/z=1625.6, 1637.6, 1649.6, 1661.6 Da, where z is the charge per molecule). The peak at 1637.6 is consistent with the presence of a disubstituted maltodextrin. MALDI-TOF Mass spectrometry showed that ~50% of the maltodextrin was disubstituted. Non-substituted, mono-substituted, and tri-substituted maltodextrin was also detected in the product mixture.

MALDI-TOF Measurement

The MALDI mass spectrum was acquired on a Bruker Daltonics ultraflex MALDI-TOF mass spectrometer equipped with a nitrogen laser (X, =337 nm). In the MALDI experiment, 20 mg of dihydroxybenzoic acid was dissolved in 1 mL of THF. Example 1 was dissolved in $H_2O$/isopropanol (4:1 v/v) at a concentration of 5 mg/mL. The solution was premixed with the matrix solution at a ratio of 1:10 v/v. NaI was added into the sample/matrix mixture and 0.3 μL of the mixture was then placed on the sample plate and was air dried for MALDI-MS analysis.

Preparation of Paint Formulation with Glycidyl Ether Adduct of Maltodextrin

The glycidyl ether adduct of maltodextrin of Example 1 was evaluated for open time and stain resistance in the following screening formulation:

TABLE 1

Paint Formulation With Open Time Additive

| Material Name | Pounds | Gallons |
|---|---|---|
| RHOPLEX ™ HG-706 Binder | 584.1 | 65.95 |
| BYK-024 Defoamer | 1.0 | 0.12 |
| Propylene Glycol | 4.3 | 0.50 |
| TRITON ™ X-100 Surfactant | 4.4 | 0.49 |
| Water | 16.7 | 2.00 |
| KATHON ™ LX 1.5% Biocide | 1.5 | 0.18 |
| TAMOL ™ 2002 Dispersant | 2.0 | 0.23 |
| Ammonia (28%) | 1.0 | 0.13 |
| Ti-Pure R-746 $TiO_2$ | 285.0 | 14.66 |
| Water | 20.0 | 2.40 |
| TEXANOL Coalescent | 7.9 | 1.00 |
| ACRYSOL ™ RM-2020E Rheology Modifier | 20.0 | 2.30 |
| ACRYSOL ™ RM-725 Rheology Modifier | 3.0 | 0.35 |
| BYK-024 Defoamer | 2.0 | 0.24 |
| Water | 68.7 | 8.2 |
| Open Time Additive (Active) | 10.3 | 1.25 |
| Totals | 1031.9 | 100.00 |

Open time was measured in accordance with ASTM-D7488. Stain resistance studies were carried out by first applying the paint formulation to a white vinyl substrate with a 7-mil (0.18-mm) doctor blade. The film was allowed to stand for 7 days and the substrates were scanned using a calibrated flatbed scanner to obtain a baseline measurement.

Stains were then applied to the dried film and allowed to set for 2 h before being subjected to the removal test: Leneta SC-1 non-abrasive media was combined with water (3:2 v/v) to form a solution. A thin film of the solution was applied to the stained coating; a non-abrasive sponge was dipped into the solution for 10 s, then contacted with the stained coating at a pressure of about 5 kPa and oscillated at 60 cycles/min (back and forth=1 cycle) for 100 s. The scrubbed substrates were rinsed with water and the stained substrates were imaged with the scanner to measure the root mean square difference in Lab coordinates between the baseline and the scrubbed stains ($\Delta E_{76}$). In the following Table 2, OTE-500 refers Rhodoline OTE-500 Additive, which is an open time additive widely used in the industry.

Table 2 illustrates the open time (OT) and stain results for a number of household stains.

TABLE 2

Open Time and Stain Results for a Variety of Household Stains

| OT additive | OT (min) | Grape | Ketchup | Lipstick | Mustard | Tea | Stain Avg |
|---|---|---|---|---|---|---|---|
| Example 1 | 6.7 | 8.4 | 7.6 | 5.2 | 12.1 | 9.9 | 8.6 |
| None | 5.0 | 8.9 | 7.6 | 5.5 | 15.7 | 10.0 | 9.5 |
| OTE-500 | 10.0 | 11.1 | 9.5 | 7.2 | 14.2 | 21.0 | 12.6 |

The compound of the present invention showed excellent stain resistance compared to OTE-500 and somewhat improved stain resistance compared to the formulation with no open time additive; additionally, the compound of the present invention showed improved open time performance with respect to the formulation with no open time additive. Accordingly, the additive of the present invention provides a coating with an improved balance of open time and stain resistance.

The invention claimed is:

1. A compound which is a phenyl glycidyl ether adduct of maltodextrin, which is represented by the compound of Formula I:

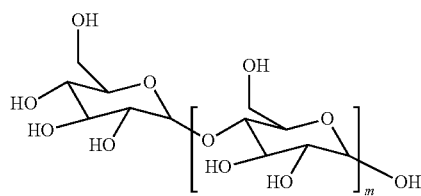

where m is from 1 to 60.

2. The compound of claim 1 wherein m is from 5 to 48 and the phenyl glycidyl ether adduct of the compound of Formula I is a multifunctional adduct.

3. The compound of claim 2 wherein m is from 11 to 36 and the phenyl glycidyl ether adduct of the compound of Formula I is a di- or trifunctional adduct.

4. The compound of claim 3 wherein m is from 15 to 24 and the phenyl glycidyl ether adduct of the compound of Formula I is a difunctional adduct.

5. The compound of claim 1 which has a number average molecular weight of from 500 to 10,000 Daltons and is substituted with at least two phenoxypropanol groups.

6. The compound of claim 5 which has a number average molecular weight of from 1000 to 8000 Daltons and is substituted with two, three, or four phenoxypropanol groups.

7. The compound of claim 6 which has a number average molecular weight of from 1500 to 5000 Daltons and is substituted with two or three phenoxypropanol groups.

8. The compound of claim 7 which has a number average molecular weight of from 1500 to 3500 Daltons and is substituted with two phenoxypropanol groups.

9. A method comprising the step of contacting maltodextrin with phenyl glycidyl ether under such conditions to form the phenyl glycidyl ether adduct of maltodextrin, where maltodextrin is represented by the following Formula I:

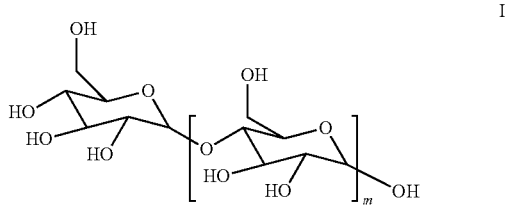

where m is from 1 to 60.

10. The method of claim 9 wherein the phenyl glycidyl ether and the maltodextrin are contacted together in the presence of a base, at a temperature in the range of from 40° C. to 100° C., and in the presence of a polar solvent.

* * * * *